(12) United States Patent
Szymula et al.

(10) Patent No.: US 11,936,316 B2
(45) Date of Patent: Mar. 19, 2024

(54) POSITION ESTIMATION FOR PERMANENT MAGNET SYNCHRONOUS MACHINES VIA ROTOR FLUX SPACE VECTOR IDENTIFICATION

(71) Applicant: STEERING SOLUTIONS IP HOLDING CORPORATION, Saginaw, MI (US)

(72) Inventors: Pawel Szymula, Bolecin (PL); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 64 days.

(21) Appl. No.: 17/863,335

(22) Filed: Jul. 12, 2022

(65) Prior Publication Data
US 2024/0022194 A1 Jan. 18, 2024

(51) Int. Cl.
*H02P 23/14* (2006.01)
*H02P 25/022* (2016.01)
*H02P 27/08* (2006.01)

(52) U.S. Cl.
CPC ............ *H02P 23/14* (2013.01); *H02P 25/022* (2013.01); *H02P 27/08* (2013.01)

(58) Field of Classification Search
CPC ......... H02P 23/14; H02P 25/022; H02P 27/08
See application file for complete search history.

(56) References Cited

U.S. PATENT DOCUMENTS

2018/0294755 A1* 10/2018 Mori .................... B62D 5/0463
2019/0252972 A1* 8/2019 Minaki .................... H02P 6/10

FOREIGN PATENT DOCUMENTS

DE 102019127750 A1 4/2020

OTHER PUBLICATIONS

Urbanski, Konrad: Estimation of back EMF for PMSM at low speed range. In: MM Science Journal, 2015, S. 564-569, ISSN 1803-1269(P).

* cited by examiner

*Primary Examiner* — Zoheb S Imtiaz
(74) *Attorney, Agent, or Firm* — Dickinson Wright PLLC

(57) ABSTRACT

A method of controlling a permanent magnet synchronous machine (PMSM) includes: determining an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM. The method also includes determining an estimated permanent magnet (PM) flux linkage in the PMSM based on the estimated motor current of the PMSM; determining a BEMF correction term based on the estimated PM flux linkage; and determining an estimated rotor flux space vector based on the estimated BEMF and the BEMF correction term.

20 Claims, 11 Drawing Sheets

POSITION ESTIMATION FOR PERMANENT MAGNET SYNCHRONOUS MACHINES VIA ROTOR FLUX SPACE VECTOR IDENTIFICATION

TECHNICAL FIELD

This disclosure relates to permanent magnet synchronous machines (PMSMs), and in particular to estimating a rotor position of a PMSM.

BACKGROUND

Permanent magnet synchronous machines (PMSMs), such as electric motors and motor/generators are commonly used in numerous applications within a vehicle, such as a car, truck, sport utility vehicle, crossover, mini-van, marine craft, aircraft, all-terrain vehicle, recreational vehicle, or other suitable vehicle. For example, the vehicle may include one or more PMSMs to control various aspects of a steering system of the vehicle.

Accurate determination of rotor position is important for high performance torque control of PMSMs. The rotor position is typically measured by a dedicated sensor, such as an encoder or a resolver. Alternatively or additionally, the rotor position may be estimated using other available signal measurements including motor currents and voltages. For safety critical applications, high fidelity rotor position estimate is required throughout the operating range. Such high fidelity rotor position estimate may be used to control the motor and/or to diagnose a measurement from a position sensor.

SUMMARY

This disclosure relates generally to controlling operation of a permanent magnet synchronous machine using a motor drive.

An aspect of the disclosed embodiments includes a method of controlling a permanent magnet synchronous machine (PMSM). The method includes: determining an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM; determining an estimated permanent magnet (PM) flux linkage in the PMSM based on the estimated motor current of the PMSM; determining a BEMF correction term based on the estimated PM flux linkage; and determining an estimated rotor flux space vector based on the estimated BEMF and the BEMF correction term.

An aspect of the disclosed embodiments includes a control system for controlling a permanent magnet synchronous machine (PMSM). The control system includes an inverter having a plurality of switches operable to supply an alternating current to the PMSM. The control system also includes a controller configured to: determine an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM; determine an estimated permanent magnet (PM) flux linkage in the PMSM based on the estimated motor current of the PMSM; determine a BEMF correction term based the estimated PM flux linkage; and determine an estimated rotor flux space vector based on the estimated BEMF and the BEMF correction term.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
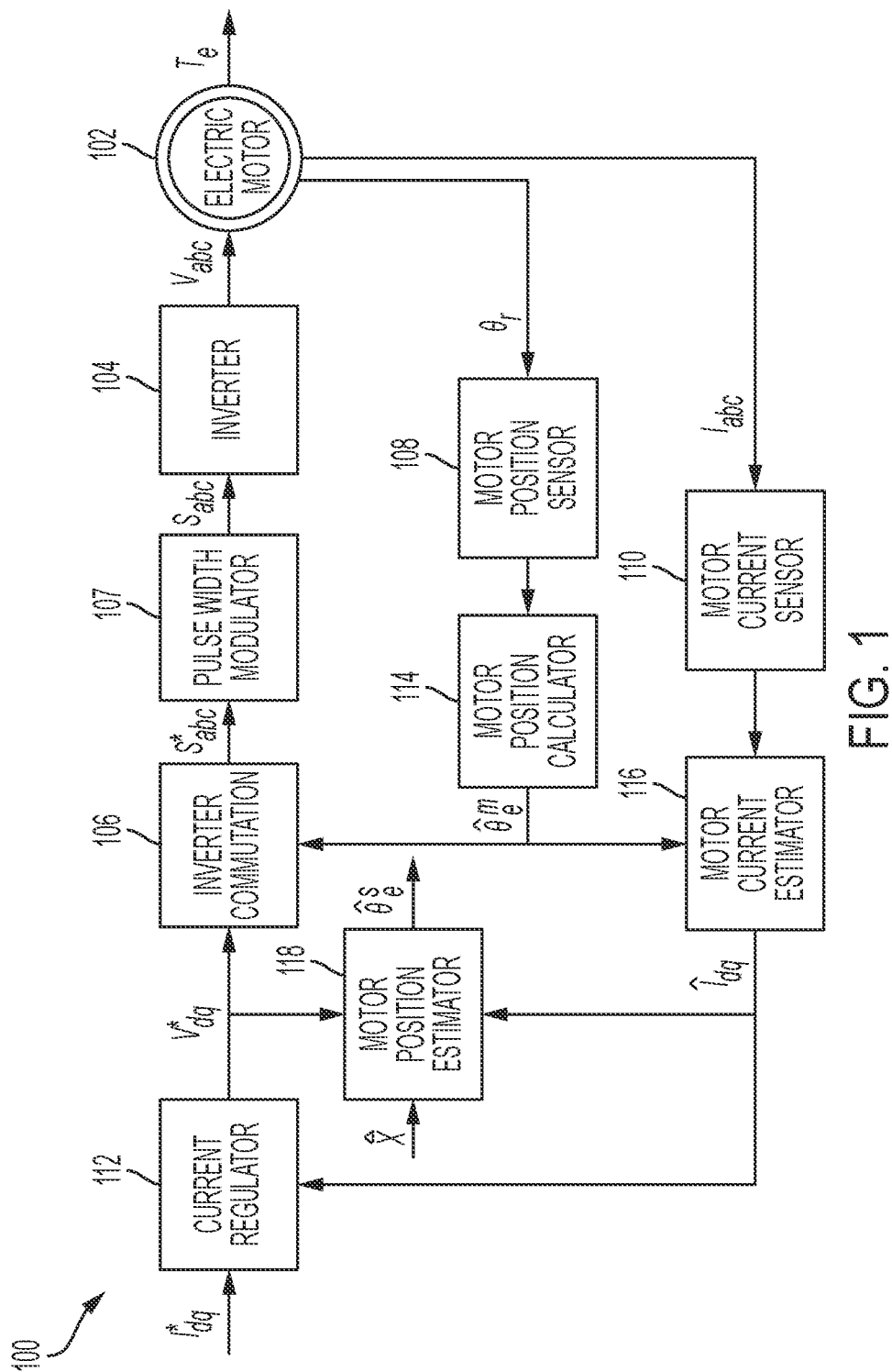
FIG. 1 shows a block diagram of a first motor control system, according to aspects of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, typically includes one or more permanent magnet synchronous machines (PMSMs), such as electric motors and the like. For example, the vehicle may include one or more PMSMs configured to control various aspects of a steering system of the vehicle.

Many PMSM control schemes need accurate rotor position information for precise and fast torque control. One common torque control method for PMSMs is Field Oriented Control (FOC), wherein the rotor position is used for transformation of three-phase variables to a rotating reference frame. The rotating reference frame includes a d-axis, which is typically aligned to the rotor flux space vector. This is typically done by calibrating the motor position sensor such that the adjusted motor position estimate is aligned with the rotor flux space vector.

The rotor position, as determined in accordance with the present disclosure, can be used in PMSM control schemes other than FOC for which the rotor position is necessary.

Typical systems use a dedicated sensor, such as an encoder or resolver, for measuring rotor position. However, such typical systems may be cost prohibitive (e.g., due to costs related to the dedicated sensor) and/or prone to sensor failure. Accordingly, systems and methods, such as those described herein, configured to determine rotor position without using a dedicated sensor, may be desirable. For example, an alternative method of determining or estimating the rotor position can be used to verify operation of a dedicated sensor and to detect faults in the dedicated sensor. The present disclosure provides for an estimation of the rotor position of a PMSM using motor voltage and current signals and motor parameters. This approach can facilitate lower system cost, higher reliability and safety. Some or all of the values used to estimate the rotor position may be known or able to be determined using information already available within an existing motor controller used to control operation of the PMSM.

According to an aspect of the disclosure, a rotor flux space vector estimation can be used to obtain a rotor flux vector position, representing an angular position of the rotor, across an entire operating speed range of the PMSM. The rotor position, as determined in accordance with the present disclosure, can be used as an alternative for a motor position sensor signal that may otherwise be used to control the PMSM. In some embodiments, the rotor position, as determined in accordance with the present disclosure, can be used in addition to a sensor signal in various motor position correlation, diagnostic or arbitration techniques.

The systems and methods of the present disclosure may include estimating rotor position of the PMSM. Some or all of the method may be implemented as a program executed by a processor. The systems and methods of the present disclosure may provide several benefits over conventional means to determine rotor position. The benefits may include lower system cost, higher reliability, improved diagnostics and fault detection and enhanced safety. The systems and methods of the present disclosure may provide a single algorithm to determine the rotor position across a wide range of motor speeds. The single algorithm may provide the rotor position for any speed within an operating range of the PMSM. The systems and methods of the present disclosure may provide the rotor speed without blending outputs of two or more different algorithms for different speeds.

The systems and methods of the present disclosure may be used to determine a rotor position of a PMSM without magnetic saliency, which is a characteristic commonly exhibited by PMSMs with surface-mounted permanent magnets. The system and method of the present disclosure may be used to determine a rotor position of a PMSM with saliency, such as a PMSM having interior-mounted permanent magnets.

The systems and methods of the present disclosure include a control system for controlling operation of a PMSM. The control system includes an inverter having a plurality of switches operable to apply an alternating current (AC) voltage to the PMSM.

The systems and methods of the present disclosure may determine or estimate the rotor flux space vector based on information regarding a PMSM back electromotive force (BEMF), stator currents, and rotor flux magnitude compensation. The angle of the rotor flux space vector can be used as an alternative for the position sensor signal used for various functions in the PMSM control. Alternatively or additionally, the angle of the rotor flux space vector can be used in various motor position correlation and/or arbitration methods, such as methods for motor control system operational safety. Using the permanent magnet (PM) flux value to estimate the rotor position can provide high accuracy for very low and high-speed operation, even in cases where one or more motor parameters has high uncertainty. Note that the PM flux, also referred to as PM flux linkage, is representative of a BEMF constant of the electric machine. More specifically, the BEMF constant is equal to PM flux scaled by the number of magnetic pole pairs of the electric machine.

According to an aspect of the disclosure, a voltage model-based rotor flux vector estimator presents good position accuracy at very low PMSM speed. The present disclosure provides an algorithm that uses an accurate estimate of the rotor PM flux to increase the accuracy of estimation of the rotor flux space vector angle. Estimated signal phase shift may be reduced by using pure integrators of the back-EMF signal. The system and method of the present disclosure provides a single solution for rotor position estimation a wide range of motor operating speeds, without any switching and/or blending between different algorithms for different motor operating speeds.

In general, techniques for rotor position estimation for PMSMs can be classified into two categories, namely fundamental model-based estimators and signal injection estimators based on motor saliency. The fundamental model-based estimators can be further classified into three categories, namely state observers, BEMF estimators, and stator or rotor flux estimators. The stator or rotor flux estimators can be realized utilizing either a current model or a voltage model, which are different representations of the mathematical model of the PMSM. The present disclosure provides technical solutions employing a voltage model rotor flux estimator.

Voltage model rotor flux estimators are typically used in medium to high PMSM speed operation ranges because of inherent characteristics of integrators used in voltage model flux estimators. Pure integrators are prone to drift problems that may result from integrator initial conditions, non-ideal stator voltage representation, inaccurate and/or distorted current measurement and errors in motor resistance estimation. There are many known ways to limit the effects of the integrator drift. Those include, for example, low-pass filter approximation of the integrator, consisting of an integrator in series with a high-pass filter. The cutoff frequency of the low-pass filter may be scheduled as a function of motor velocity or other signals. The integrator may be used to obtain the PM flux from the motor BEMF, and the high-pass filter may be used to remove the integrator's drift, which may result from initial integrator state inaccuracies. However, these methods still do not provide necessary position estimation accuracy at zero to low PMSM speed.

The electric motor 102 may include a multiphase electric machine or other suitable machine. In some embodiments, as is generally illustrated, the electric motor 102 may include a three-phase machine. Additionally, or alternatively, the electric motor 102 and the inverter 104 may include any suitable number of phases.

The present disclosure provides a voltage model-based rotor flux vector estimator which provides the estimated motor electrical position θe with good accuracy at zero to low PMSM speed. The system and method of the present disclosure may include using of a known value of nominal PMSM rotor flux or back-EMF constant for estimated rotor flux space vector compensation in a feedback control system. The present disclosure provides a proportional regulator type feedback control, but various other types of linear or nonlinear regulators can be used for rotor flux space vector control compensation.

The voltage model-based rotor flux vector estimator of the present disclosure may use pure integrators for integrating the back-EMF signal, which may reduce phase shift of a resulting estimated signal.

FIG. 1 generally illustrates a block diagram of a first motor control system 100 for performing torque control via feedback current control of the electric motor 102. The first motor control system 100 may also be called an electric motor drive system. The electric motor 102 may be a PMSM. All or part of the first motor control system 100 may be implemented as program instructions performed by the controller. Alternatively or additionally, some or all of the first motor control system 100 may be performed by other hardware and/or by program instructions executed elsewhere. The motor position sensor 108 measures a rotor position $\theta_r$. The measured rotor position $\theta_r$ may be used to control operation of the electric motor 102. For example, the measured rotor position $\theta_r$ may be used for vector control of the electric motor 102. The motor position calculator 114 receives the measured rotor position information from the motor position sensor 108 to compute a calculated motor electrical position $\hat{\theta}_e^m$.

The first motor control system 100 includes a current regulator 112 responsible for performing motor current tracking. Motor current tracking involves minimizing the error between the commanded current $I^*_{dq}$ and an estimated motor current $\hat{I}_{dq}$ of the electric motor 102. The commanded current $I^*_{dq}$ may consist of a direct (d-) axis current command $I^*_d$ and a quadrature (q-) axis current command $I^*_q$ and may be determined using widely employed techniques (not shown) of maximum torque per ampere (MTPA) and maximum torque per voltage (MTPV) which compute optimal current commands that would simultaneously ensure that the voltage required for generating the commanded currents $I^*_{dq}$ does not exceed the available voltage while optimizing the total current required to best meet the commanded torque in order to ensure minimal loss. The current regulator 112 may minimize the current error using, for example, a proportional-integral-derivative (PID) controller. However, other control techniques may be used, such as a proportional-integral (PI) controller. The estimated motor current $\hat{I}_{dq}$ are computed by the motor current estimator 116 using a widely known reference frame transformation based on measurements of phase currents $I_{abc}$ in a stationary reference frame and based on the calculated motor electrical position $\hat{\theta}_e^m$.

The current regulator 112 generates motor voltage commands $V^*_{dq}$ which are utilized by an inverter commutator 106 that computes switching signals $S^*_{abc}$ that are in-turn used by a pulse width modulator 107, which may also be called a gate driver, to command switches of an inverter 104 on and off so as to generate and apply motor voltages $V_{abc}$ to windings of the electric motor 102. Note that the inverter commutator 106 may contain logic for computing inverter voltage output commands and/or for a switching technique involving desired on and off times for the individual switches of the inverter 104. The applied motor voltages $V_{abc}$ cause the electric motor 102 to generate the phase currents $I_{abc}$ and the actual electromagnetic torque $T_e$.

The first motor control system 100 of FIG. 1 includes a motor position estimator 118. The motor position estimator 118 computes an estimated motor electrical position $\hat{\theta}_e^s$ via rotor flux identification, which utilizes the motor voltage commands $V^*_{dq}$, estimated motor current $\hat{I}_{dq}$ and estimates of motor drive parameters collectively represented by $\hat{\bar{X}}$.

Estimation of motor drive parameters involves utilizing mathematical models representing the variation of various parameters as a function of operating conditions, specifically the temperature of different parts of the system and the level of magnetic saturation.

Figure 2:
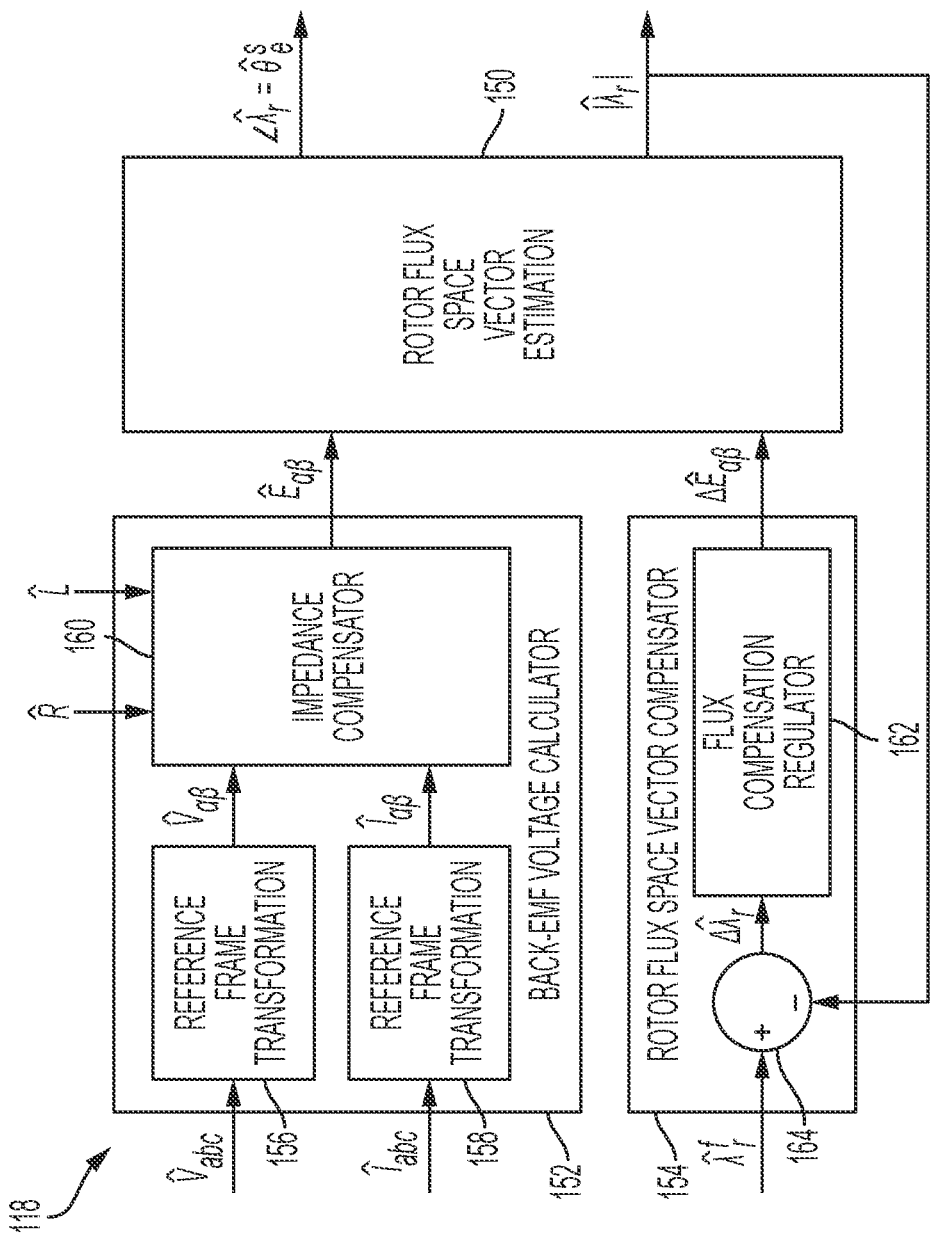
FIG. 2 shows a block diagram of a motor position estimator of a motor control system, according to the principles of the present disclosure.

FIG. 2 shows a block diagram of the motor position estimator 118, which is configured to determine an estimated rotor flux space vector $\hat{\lambda}_r$ based on estimated phase currents $\hat{I}_{abc}$ and estimated phase voltages $\hat{V}_{abc}$ supplied to the electric motor 102. The estimated phase currents $\hat{I}_{abc}$ may represent current generated in the windings of the electric motor 102, and the estimated phase voltages $\hat{V}_{abc}$ may represent voltages applied to the windings of the electric motor 102. Either or both of the estimated phase currents $\hat{I}_{abc}$ and estimated phase voltages $\hat{V}_{abc}$ may be determined based on measurements from sensors connected to one or more conductors between the inverter 104 the electric motor 102. Alternatively or additionally, either or both of the estimated phase currents $\hat{I}_{abc}$ and estimated phase voltages $\hat{V}_{abc}$ may be determined based on other measurements and/or based on commanded or actual operation devices, such as switching transistors, within the inverter 104.

The motor position estimator 118 is configured to determine an estimated rotor flux space vector $\lambda_r$ based on several motor drive parameters $\hat{\bar{X}}$ of the electric motor 102. The motor drive parameters $\hat{\bar{X}}$ may include one or more of: an estimated synchronous inductance $\hat{L}$, an estimated motor circuit resistance $\hat{R}$, and a feedforward estimate of PM flux linkage $\hat{\lambda}_r^f$. The estimated rotor flux space vector $\hat{\lambda}_r$ may be represented in polar coordinates as an estimated rotor flux angle $\angle\hat{\lambda}_r$, and an estimated rotor flux magnitude $|\hat{\lambda}_r|$. The estimated rotor flux angle $\angle\hat{\lambda}_r$ is equivalent to the estimated motor electrical position $\hat{\theta}_e^s$.

The motor position estimator 118 includes a rotor flux space vector estimator 150 which calculates the estimated rotor flux space vector $\hat{\lambda}_r$ based on an estimated BEMF $\hat{E}_{\alpha\beta}$ generated in windings of the electric motor 102 and a BEMF correction term $\Delta\hat{E}_{\alpha\beta}$. The motor position estimator 118 includes a BEMF voltage calculator 152 configured to calculate the estimated BEMF $\hat{E}_{\alpha\beta}$ generated in windings of the electric motor 102. The motor position estimator 118 also includes a rotor flux space vector compensator 154 configured to calculate the BEMF correction term $\Delta\hat{E}_{\alpha\beta}$.

The estimated rotor flux space vector $\hat{\lambda}_r$ is a vector having a magnitude $|\hat{\lambda}_r|$ equal to a permanent magnet (PM) flux linkage $\lambda_r$, which represents the magnetic field strength of rotor magnets in the electric motor 102 and varies as a result of magnetic saturation which is most prevalent under high currents and due to variation of temperature of magnets. The flux linkage $\lambda_r$ may be defined by equation (1), below:

$$\lambda_r = \kappa_\lambda \lambda_r^0 (1 + \alpha_m(\Omega_m - \Omega_0)) \quad (1)$$

where $\lambda_r^0$ is the value of PM flux linkage at the nominal temperature of $\Omega_0$, $\kappa_\lambda$ is a scale factor that varies with motor currents to account for magnetic saturation, $\alpha_m$ is a temperature coefficient of the permanent magnets in the rotor of the electric motor 102, and $\Omega_m$ is the actual temperature of the permanent magnets in the rotor of the electric motor 102.

In some embodiments, and as shown in FIG. 2, the rotor flux space vector estimator 150 may generate the rotor flux space vector $\hat{\lambda}_r$ in polar coordinates as an estimated rotor flux angle $\angle \hat{\lambda}_r$, and an estimated rotor flux magnitude $|\hat{\lambda}_r|$. The estimated rotor flux angle $\angle \hat{\lambda}_r$ is equivalent to the estimated motor electrical position $\hat{\theta}_e^s$. Alternatively or additionally, the rotor flux space vector estimator 150 may generate the rotor flux space vector $\hat{\lambda}_r$ in another form, which may be subsequently converted to the polar coordinates to generate the estimated motor electrical position $\hat{\theta}_e^s$.

The BEMF voltage calculator 152 is configured to calculate the estimated BEMF $\hat{E}_{\alpha\beta}$ generated in windings of the electric motor 102 based on: the estimated phase currents $\hat{I}_{abc}$, the estimated phase voltages $\hat{V}_{abc}$, the estimated synchronous inductance L, and the estimated motor circuit resistance R of the electric motor 102.

The BEMF voltage calculator 152 includes a first reference frame transformer 156 configured to calculate an estimated alpha-beta voltage $\hat{V}_{\alpha\beta}$ in the alpha-beta reference frame, which may also be called the rotor reference frame, based on the estimated phase voltages $\hat{V}_{abc}$. The BEMF voltage calculator 152 also includes a second reference frame transformer 158 configured to calculate an estimated alpha-beta current $\hat{I}_{\alpha\beta}$ in the stationary reference frame, based on the estimated phase currents $\hat{I}_{abc}$. Either or both of the reference frame transformers 156, 158 may use a three-phase to two-phase stationary reference frame transformation to perform the corresponding calculations.

The BEMF voltage calculator 152 also includes an impedance compensator 160 configured to calculate the configured to calculate the estimated BEMF $\hat{E}_{\alpha\beta}$ based on the alpha-beta voltage $\hat{V}_{\alpha\beta}$, the alpha-beta current $\hat{I}_{\alpha\beta}$, the estimated synchronous inductance $\hat{L}$, and the estimated motor circuit resistance $\hat{R}$ of the electric motor 102.

The rotor flux space vector compensator 154 includes a flux compensation regulator 162 configured to calculate the BEMF correction term $\Delta \hat{E}_{\alpha\beta}$ based on a PM flux linkage difference $\Delta \hat{\lambda}_r$, representing a difference between an open-loop or feedforward estimated permanent magnet (PM) flux linkage $\hat{\lambda}_r^f$ and the estimated rotor flux magnitude $|\hat{\lambda}_r|$, as shown in FIG. 2. The rotor flux space vector compensator 154 also includes a difference block 164 configured to calculate the flux linkage difference $\Delta \hat{\lambda}_r$ based on the open-loop or feedforward estimated permanent magnet (PM) flux linkage $\hat{\lambda}_r^f$ and the estimated rotor flux magnitude $|\hat{\lambda}_r|$.

Figure 3:
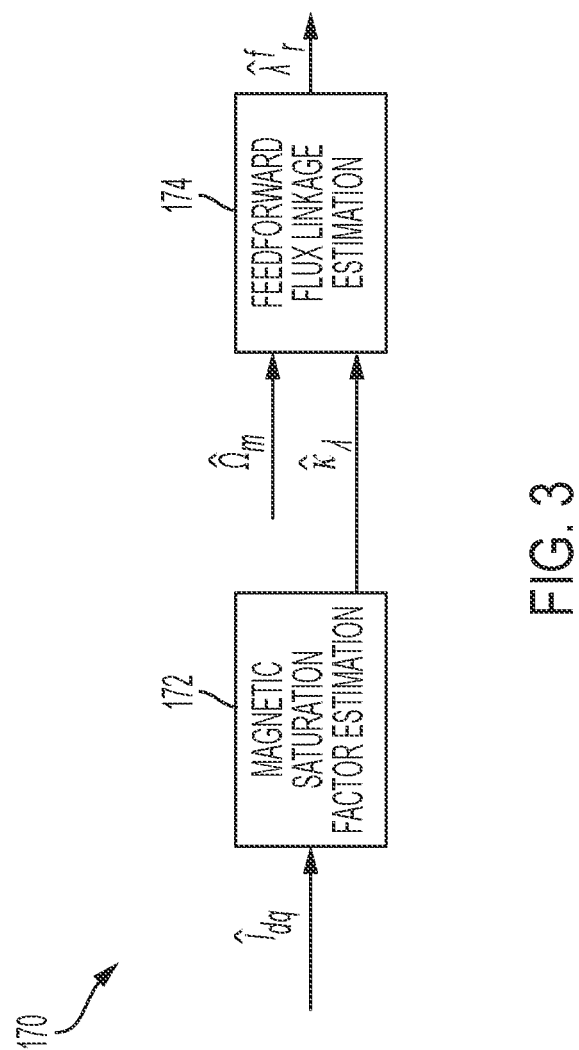
FIG. 3 shows a block diagram of a flux linkage estimator of a motor control system, according to aspects of the present disclosure.

FIG. 3 shows a block diagram of a flux linkage estimator 170 configured to determine the feedforward estimated permanent magnet (PM) flux linkage $\hat{\lambda}_r^f$ based on the estimated motor current $\hat{I}_{dq}$. The flux linkage estimator 170 may be included within the motor position estimator 118, although it may be implemented separately. The estimated motor current $\hat{I}_{dq}$ used by the flux linkage estimator 170 may include d,q-axis currents, although the flux linkage estimator 170 may use the estimated motor current in another form, such as the estimated alpha-beta current $\hat{I}_{\alpha\beta}$ or the estimated phase currents $\hat{I}_{abc}$.

As shown on FIG. 3, the flux linkage estimator 170 includes a magnetic saturation factor estimator 172 configured to determine an estimated magnetic saturation factor $\hat{\kappa}_\lambda$ of the electric motor 102 based on the estimated motor current $\hat{I}_{dq}$. The flux linkage estimator 170 also includes a feedforward flux linkage estimator 174 configured to determine the feedforward estimated PM flux linkage $\hat{\lambda}_r^f$ based on the estimated magnetic saturation factor $\hat{\kappa}_\lambda$ and an estimated temperature $\hat{\Omega}_m$ of rotor magnets within the electric motor 102.

The feedforward estimated PM flux linkage $\hat{\lambda}_r^f$ may be calculated using equation (2), below:

$$\hat{\lambda}_r^f = \hat{\kappa}_\lambda \lambda_r^0 (1 + \hat{\alpha}_m (\hat{\Omega}_m - \hat{\Omega}_0)) \qquad (2)$$

where the accent ^ represents estimates of the corresponding actual quantities. Note that the magnetic saturation factor $\hat{\kappa}_\lambda$ is a map of scalars near unity that varies as a function of both the d- and q-axis currents $I_d$, $I_q$. This map may be determined using either high fidelity finite element models of the electric motor 102 or through experiments.

Figure 4:
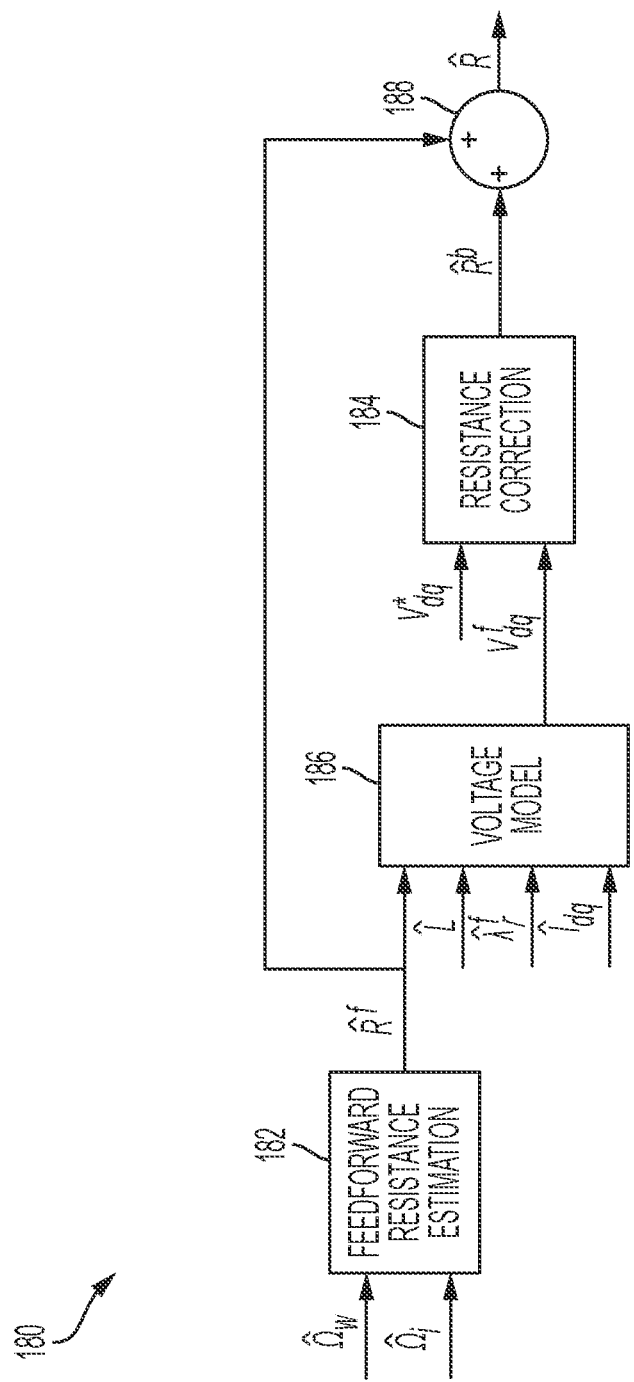
FIG. 4 shows a block diagram of a motor circuit resistance estimator of a motor control system, according to aspects of the present disclosure.

FIG. 4 shows a block diagram of a motor circuit resistance estimator 180 configured to determine the estimated motor circuit resistance $\hat{R}$ of the electric motor 102. The motor circuit resistance estimator 180 may be included within the motor position estimator 118, although it may be implemented separately. The motor circuit resistance estimator 180 includes a feedforward resistance estimator 182, which may also be called an open-loop resistance estimator, configured to determine a feedforward estimated resistance $\hat{R}^f$ based on an estimated winding temperature $\hat{\Omega}_w$ of the windings of the electric motor 102 and an estimated switch temperature $\hat{\Omega}_i$ of a switching circuit within the inverter 104, which supplies power to the electric motor 102. Either or both of the estimated winding temperature $\hat{\Omega}_w$ and/or the estimated switch temperature $\hat{\Omega}_i$ may be determined based on one or more temperature measurements. Alternatively or additionally, either or both of the estimated winding temperature $\hat{\Omega}_w$ and/or the estimated switch temperature $\hat{\Omega}_i$ may be determined based on other factors, such as based on power supplied to the electric motor 102 over time.

The motor circuit resistance R consists of the sum of the stator winding resistance $R_w$ and the resistance of the switches of the inverter $R_i$, which depend on the corresponding temperatures of the winding $\Omega_w$ and the switches $\Omega_i$ respectively.

The motor circuit resistance R may be expressed by equation (3), below:

$$R = R_w^0 (1 + \alpha_w (\Omega_w - \Omega_0)) + R_i^0 (1 + \alpha_i (\Omega_i - \Omega_0)) \qquad (3)$$

where $R_w^0$ and $R_i^0$ are the nominal values of the stator and switch resistance respectively, and $\alpha_w$ and $\alpha_i$ represent the temperature coefficient of the stator windings and inverter switches respectively.

Thus, the feedforward estimated resistance $\hat{R}^f$ may be calculated using equation (4), below:

$$\hat{R}^f = \hat{R}_w^0 (1 + \hat{\alpha}_w (\hat{\Omega}_w - \hat{\Omega}_0)) + \hat{R}_i^0 (1 + \hat{\alpha}_i (\hat{\Omega}_i - \hat{\Omega}_0)) \qquad (4)$$

As shown in FIG. 4, the motor circuit resistance estimator 180 also includes a resistance correction estimator 184 configured to determine a resistance correction term $\hat{R}^b$, which may also be called a feedback estimated resistance. The resistance correction estimator 184 determines the resistance correction term $\hat{R}^b$ based on the motor voltage command $V^*_{dq}$ for controlling the inverter 104 supplying power to the electric motor 102. The motor voltage command $V^*_{dq}$ may represent a desired voltage to be generated by the inverter 104 for power supplied to the electric motor 102. The motor voltage command $V^*_{dq}$ may include one or more signals generated by the current regulator 112 and utilized by the inverter commutator 106 to compute the switching signals $S^*_{abc}$ for controlling the switches of the inverter 104. The resistance correction estimator 184 also determines the resistance correction term $\hat{R}^b$ based on a feedforward voltage $V_{dq}^f$, which may also be called an estimated winding voltage of the electric motor 102.

The motor circuit resistance estimator 180 also includes a voltage model 186 configured to determine the feedforward voltage $V_{dq}^f$ of the electric motor 102 based on one or more parameters of the electric motor. For example, and as shown in FIG. 4, the voltage model 186 may determine the feedforward voltage $V_{dq}^f$ of the electric motor 102 based on: the feedforward estimated resistance $\hat{R}^f$, an estimated synchronous inductance $\hat{L}$, and the feedforward estimated PM flux linkage $\hat{\lambda}_r^f$ of the electric motor 102.

The motor circuit resistance estimator 180 also includes a resistance summing block 188 configured to determine the estimated motor circuit resistance $\hat{R}$ as a sum of the feedforward estimated resistance $\hat{R}^f$ and the resistance correction term $\hat{R}^b$.

Figure 5:
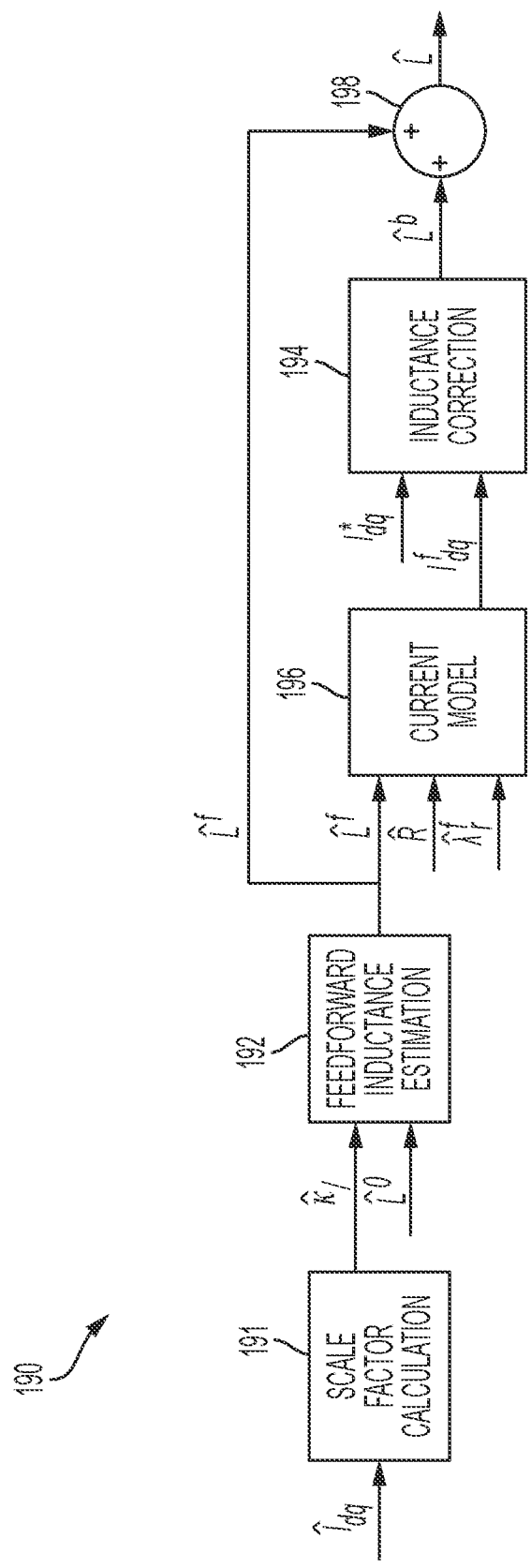
FIG. 5 shows a block diagram of a synchronous inductance estimator of a motor control system, according to aspects of the present disclosure.

FIG. 5 shows a block diagram of a synchronous inductance estimator 190 configured to determine the estimated synchronous inductance $\hat{L}$ of the electric motor 102. The synchronous inductance estimator 190 may be included within the motor position estimator 118, although it may be implemented separately. The synchronous inductance estimator 190 includes an inductance scale factor calculator 191 configured to determine an inductance scale factor $\hat{\kappa}_l$ based on the estimated motor current $\hat{I}_{dq}$, which may represent an estimate of current generated in the windings of the electric motor 102. The synchronous inductance estimator 190 also includes a feedforward inductance estimator 192, configured to determine a feedforward estimated inductance $\hat{L}^f$ based on the inductance scale factor $\hat{\kappa}_l$ and based on a nominal inductance $L^0$ the electric motor 102.

The synchronous inductance L varies due to magnetic saturation, represented by a scale factor $\kappa_l$ which is a function of motor currents, and may represented by equation (5), below:

$$L = \kappa_l L^0 \quad (5)$$

Utilizing the model, feedforward inductance estimator 192 may determine the feedforward estimated inductance $\hat{L}^f$ using equation (6), below:

$$\hat{L}^f = \hat{\kappa}_l L^0 \quad (6)$$

As shown in FIG. 5, the synchronous inductance estimator 190 also includes a inductance correction estimator 194 configured to determine an inductance correction term $\hat{L}^b$, which may also be called a feedback estimated inductance. The inductance correction estimator 194 determines the inductance correction term $\hat{L}^b$ based on a commanded current $I^*_{dq}$ supplied to the current regulator 112 for controlling the electric motor 102. The inductance correction estimator 194 also determines the inductance correction term $\hat{L}^b$ based on a reconstructed current $I_{dq}^f$, which may represent a calculation of the motor current based on a mathematical model, referred to as the current model, of the electric motor 102.

The synchronous inductance estimator 190 also includes a current model 196 configured to determine the reconstructed current $I_{dq}^f$ based on one or more parameters of the electric motor. For example, and as shown in FIG. 5, the current model 196 may determine the reconstructed current $I_{dq}^f$ of the electric motor 102 based on: the feedforward estimated inductance $\hat{L}^f$, the estimated motor circuit resistance $\hat{R}$, and the feedforward estimated PM flux linkage $\hat{\lambda}_r^f$ of the electric motor 102.

The synchronous inductance estimator 190 also includes an inductance summing block 198 configured to determine the estimated synchronous inductance $\hat{L}$ of the electric motor 102 $\hat{L}$ as a sum of the feedforward estimated inductance $\hat{L}^f$ and the inductance correction term $\hat{L}^b$.

Figure 6:
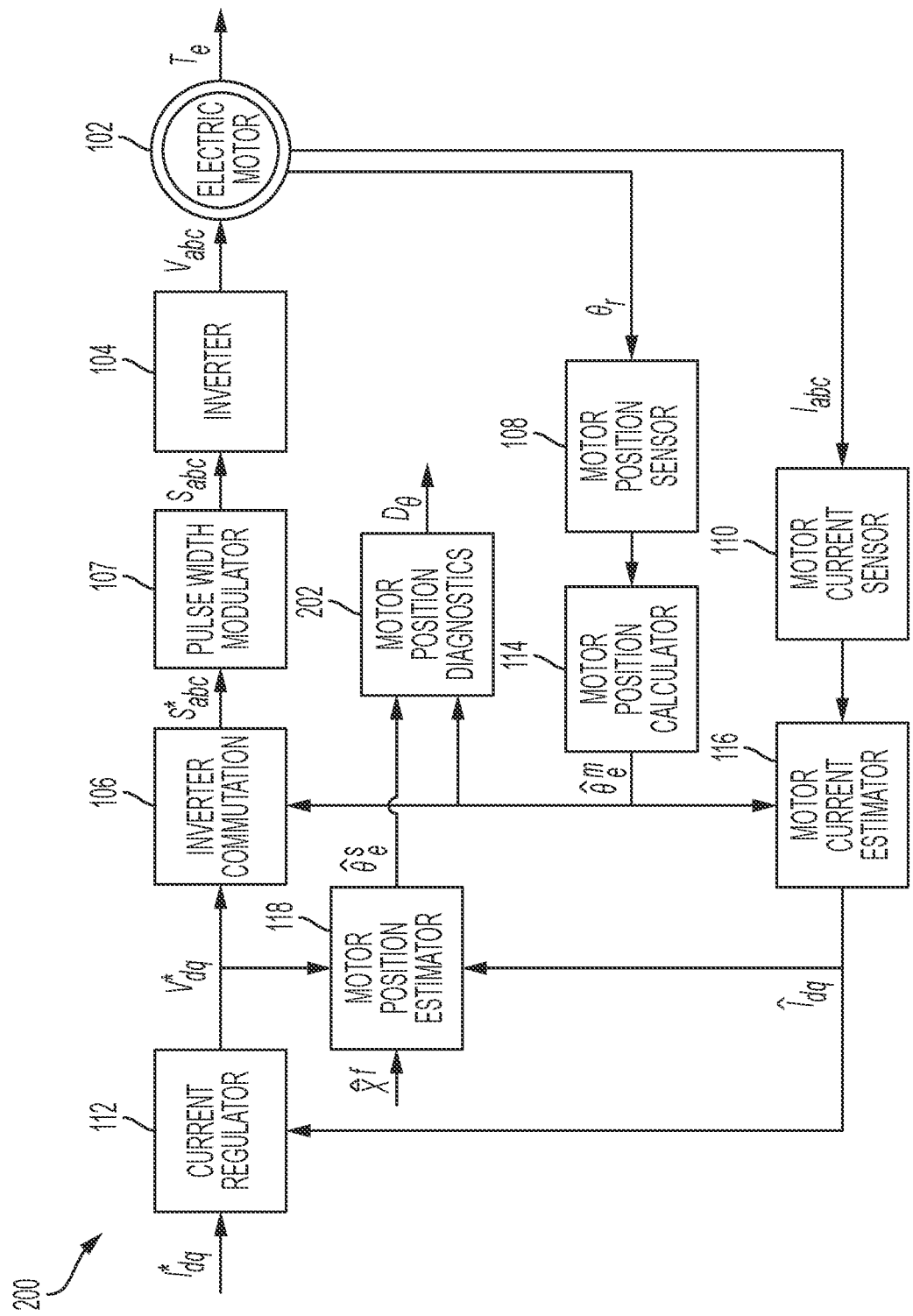
FIG. 6 shows a block diagram of a second motor control system, according to aspects of the present disclosure.

FIG. 6 shows a block diagram of a second motor control system 200. The second motor control system 200 may be similar or identical to the first motor control system 100 of FIG. 1, but with the addition of a motor position verifier 202 configured to verify the measurement of the rotor position $\theta_r$ by comparing the calculated motor electrical position $\hat{\theta}_e^m$ (which is based on the measured rotor position information from the motor position sensor 108) with the estimated motor electrical position $\hat{\theta}_e^s$ from the motor position estimator 118. The motor position verifier 202 may determine an angle deviation signal based on a difference between the calculated motor electrical position $\hat{\theta}_e^m$ and the estimated motor electrical position $\hat{\theta}_e^s$ from the motor position estimator 118.

The motor position verifier 202 may determine the measurement of the rotor position $\theta_r$ to be faulty if the calculated motor electrical position $\hat{\theta}_e^m$ and the estimated motor electrical position $\hat{\theta}_e^s$ differ by more than a predetermined amount. The second motor control system 200 may be configured to take one or more corrective actions in response to determining the measurement of the rotor position $\theta_r$ as being faulty. For example, the second motor control system 200 may designate the calculated motor electrical position $\hat{\theta}_e^m$ as being unreliable and/or unavailable for use. The second motor control system 200 may use alternative sources of motor position data, such as the estimated motor electrical position $\hat{\theta}_e^s$ and/or a backup motor position sensor (not shown). Alternatively or additionally, the second motor control system 200 may generate, store, and/or communicate a message, such as a diagnostic trouble code $D_\theta$, in response to determining the measurement of the rotor position $\theta_r$ as being faulty.

Figure 7:
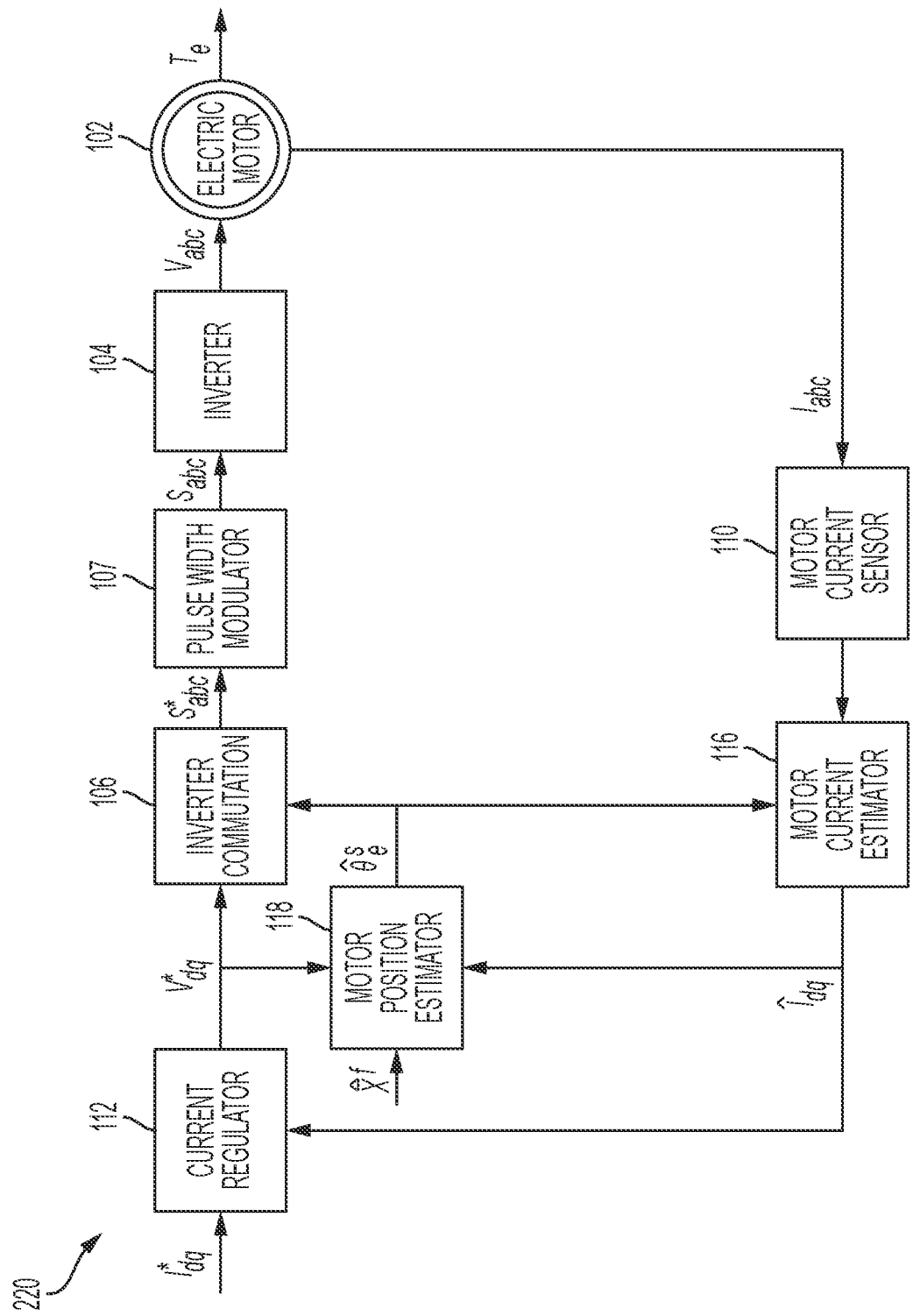
FIG. 7 shows a block diagram of a third motor control system, according to aspects of the present disclosure.

FIG. 7 shows a block diagram of a third motor control system 220. The third motor control system 220 may be similar or identical to the first motor control system 100 of FIG. 1, but with changes described herein. The third motor control system 220 includes no motor position sensor. All functions that use the rotor position of the electric motor 102 may, instead, use the estimated motor electrical position $\hat{\theta}_e^s$ from the motor position estimator 118. For example, each of the inverter commutator 106 and the motor current estimator 116 may use the estimated motor electrical position $\hat{\theta}_e^s$ from the motor position estimator 118 instead of the calculated motor electrical position $\hat{\theta}_e^m$ for performing their respective functions.

Figure 8:
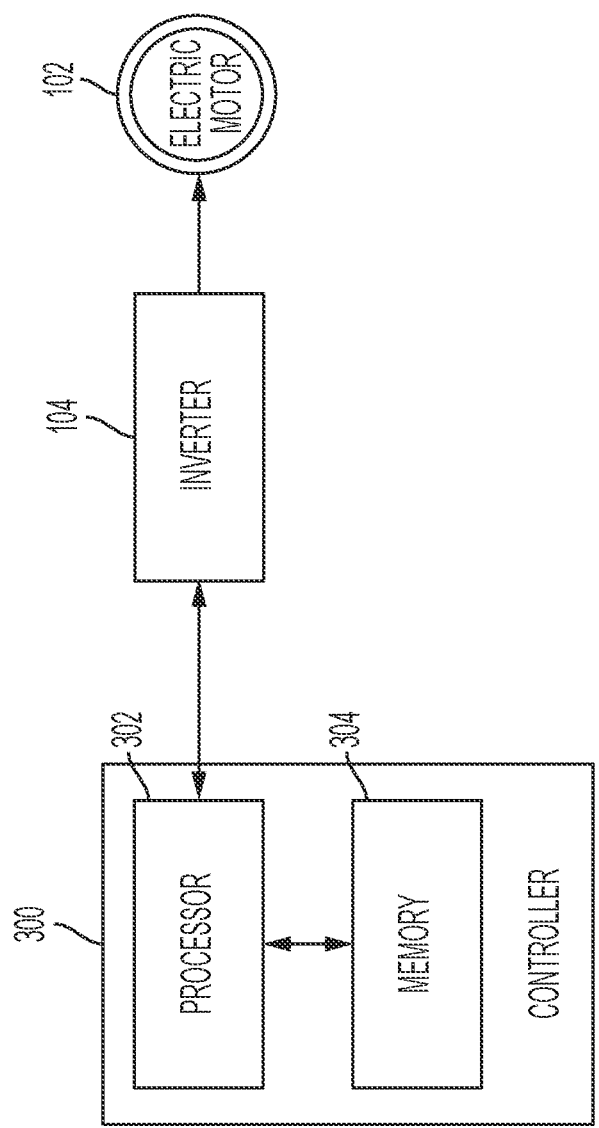
FIG. 8 shows a block diagram showing hardware components of a motor control system, according to aspects of the present disclosure.

FIG. 8 shows a block diagram showing hardware components of a motor control system. As shown in FIG. 8, the motor control system includes a controller 300. The controller 300 may include any suitable controller. In some embodiments, the controller 300 may be configured to perform various calculations and other functions and/or operations of the vehicle. In some embodiments, the controller 300 may be configured to control operation of the electric motor 102, which may include a PMSM. In some embodiments, the controller 300 may be configured to use various motor control applications, such as various closed control loop control applications or other suitable control applications. The controller 300 may be configured to control, for example, various aspects of a motion control system such as an electronic power steering system. The controller 300 may include a processor 302 and a memory 304.

The processor 302 may include any suitable processor, such as those described herein. Additionally, or alternatively, the controller 300 may include any suitable number of processors, in addition to or other than the processor 302. The memory 304 may comprise a single disk or a plurality of disks (e.g., hard drives), and includes a storage management module that manages one or more partitions within the memory 304. In some embodiments, memory 304 may include flash memory, semiconductor (solid state) memory or the like. The memory 304 may include Random Access Memory (RAM), a Read-Only Memory (ROM), or a combination thereof. The memory 304 may include instructions that, when executed by the processor 302, cause the processor 302 to, at least, control various functions of the vehicle. As shown in FIG. 8, the processor 302 may be in functional communication with the inverter 104 for controlling operation of the motor control system.

Figure 9A:
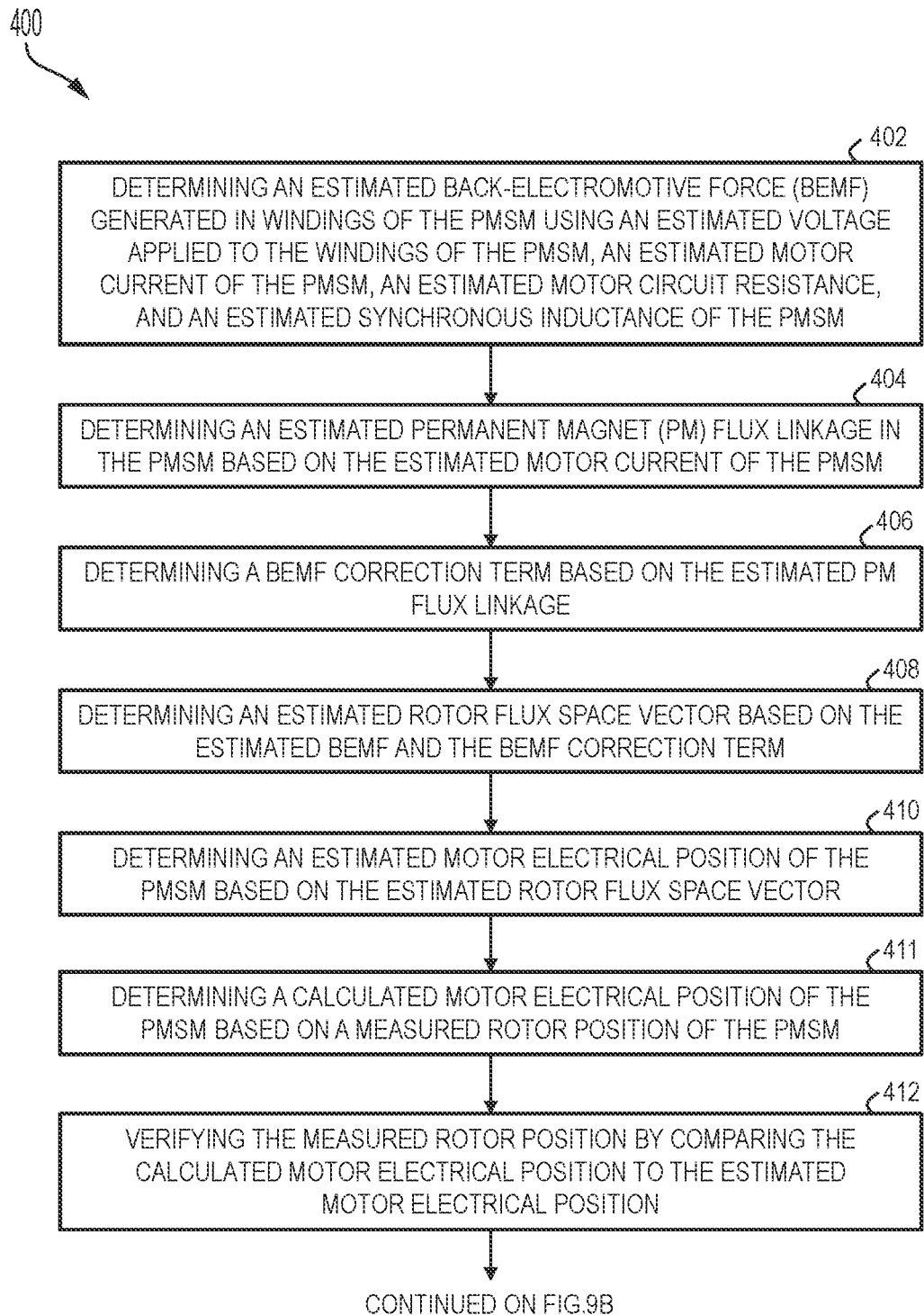
FIGS. 9A-9C show a flow diagram generally illustrating a method for controlling a permanent magnet synchronous machine, according to principles of the present disclosure.
Figure 9B:
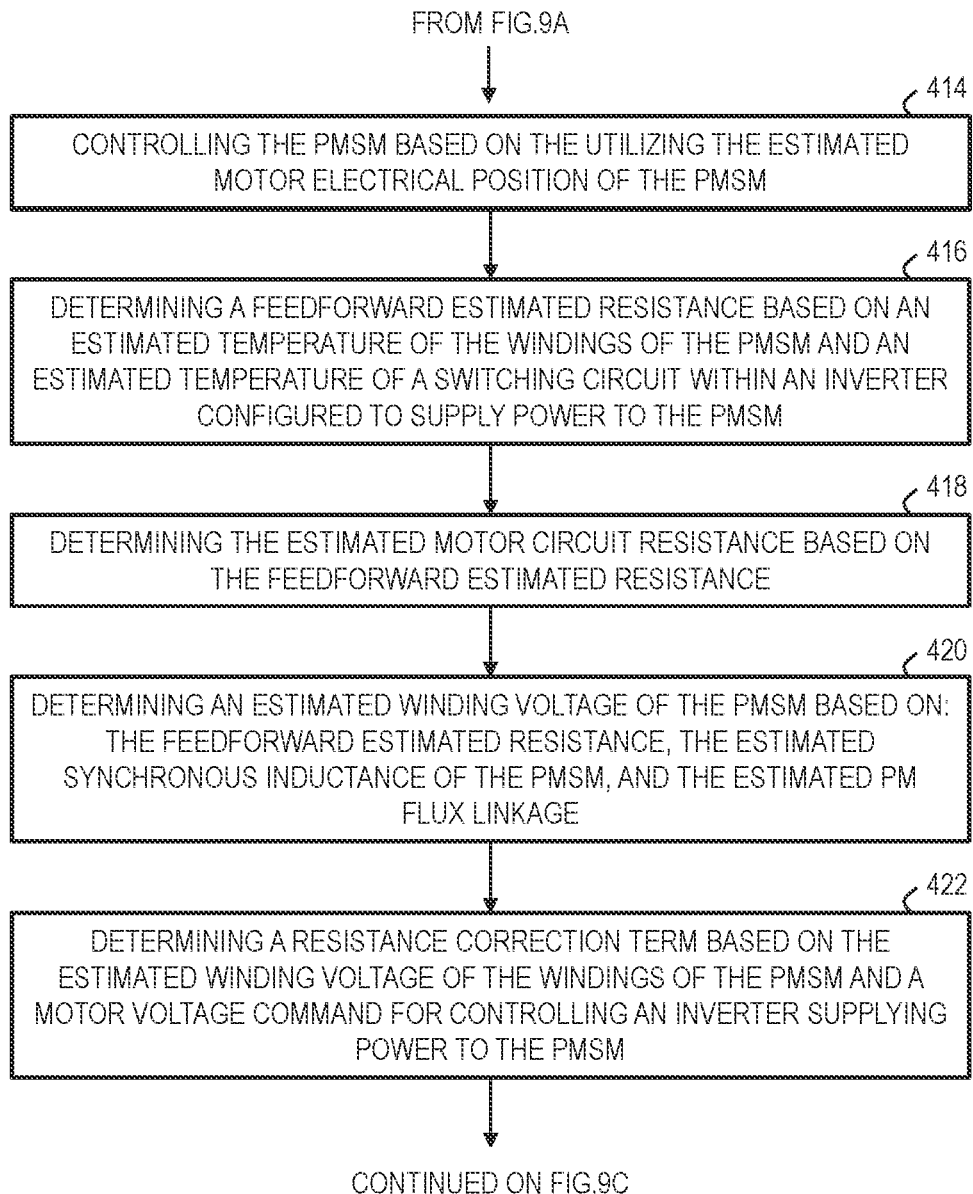
Figure 9C:
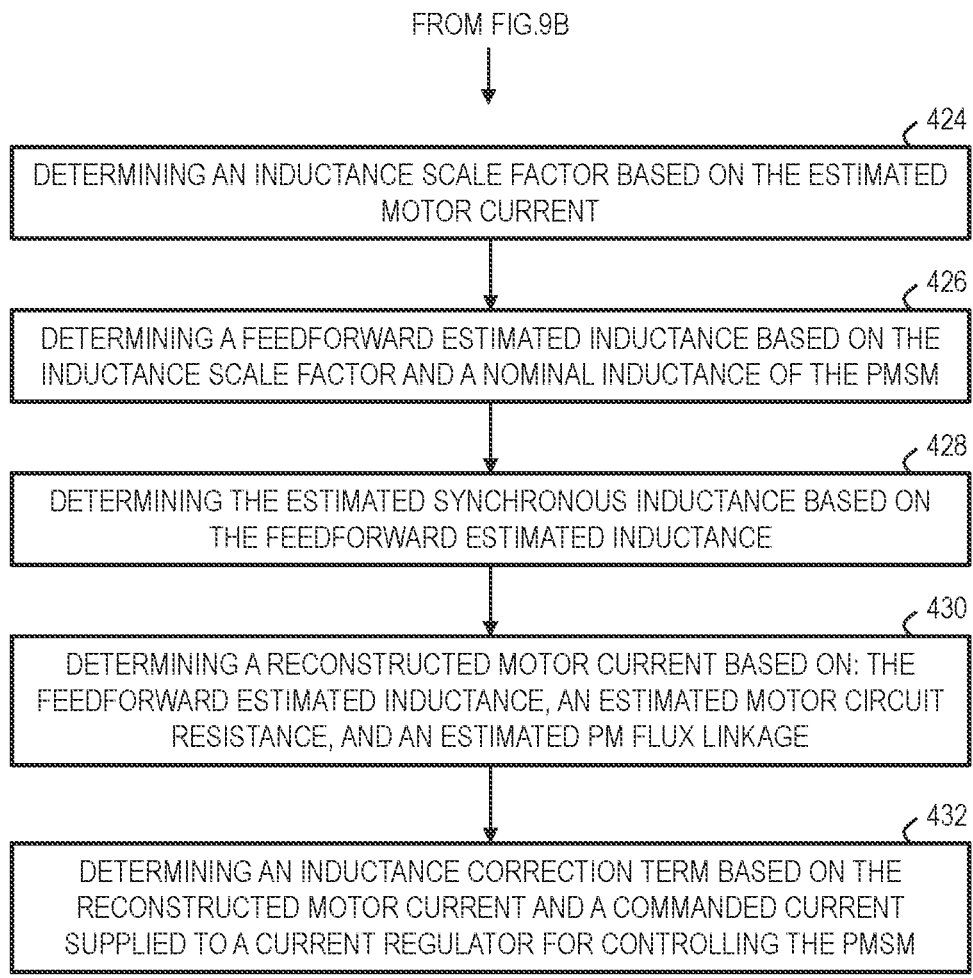

FIGS. 9A-9C show a flow diagram generally illustrating a method 400 for controlling a PMSM, according to principles of the present disclosure. The method 400 may be implemented using on or more of the motor control systems 100, 200, 220, and particularly with an electric motor 102 that includes a PMSM. One or more steps of the method 400 can be performed by the controller 300, in accordance with some embodiments of the present disclosure. As can be appreciated in light of the disclosure, the order of operation within the method is not limited to the sequential execution as illustrated in FIG. 9A-9C, but may be performed in one or more varying orders as applicable and in accordance with the present disclosure.

At 402, the method 400 determines an estimated back-electromotive force (BEMF) generated in windings of the PMSM using an estimated voltage applied to the windings of the PMSM, an estimated motor current of the PMSM, an estimated motor circuit resistance, and an estimated synchronous inductance of the PMSM. For example, the controller 300 may include one or more hardware and/or software components implementing the BEMF voltage calculator 152 to calculate the estimated BEMF $\hat{E}_{\alpha\beta}$ generated in windings of the electric motor 102, based on: the estimated phase voltages $\hat{V}_{abc}$, the estimated phase currents $\hat{I}_{abc}$, the estimated motor circuit resistance $\hat{R}$, and the estimated synchronous inductance $\hat{L}$ of the electric motor 102.

At 404, the method 400 determines an estimated permanent magnet (PM) flux linkage in the PMSM based on the estimated motor current of the PMSM. For example, the controller 300 may include one or more hardware and/or software components implementing the flux linkage estimator 170 configured to determine the feedforward estimated permanent magnet (PM) flux linkage $\hat{\lambda}_r^f$ based on the estimated motor current $I^*_{dq}$.

In some embodiments, step 404 may include determining an estimated magnetic saturation scale factor based on the estimated motor current of the PMSM. For example, the controller 300 may include one or more hardware and/or software components implementing the magnetic saturation factor estimator 172 to determine the estimated magnetic saturation factor $\hat{\kappa}_\lambda$ of the electric motor 102 based on the estimated motor current $\hat{I}_{dq}$.

In some embodiments, step 404 may include determining the estimated PM flux linkage based on the estimated magnetic saturation scale factor. For example, the controller 300 may include one or more hardware and/or software components implementing the feedforward flux linkage estimator 174 to determine the feedforward estimated PM flux linkage $\hat{\lambda}_r^f$ based on the estimated magnetic saturation factor $\hat{\kappa}_\lambda$. In some embodiments, step 404 may further include determining the estimated PM flux linkage based on an estimated temperature of rotor magnets of the PMSM. For example, the feedforward flux linkage estimator 174 may also use an estimated temperature $\hat{\Omega}_m$ of rotor magnets within the electric motor 102 to determine the feedforward estimated PM flux linkage $\hat{\lambda}_r^f$. The estimated temperature $\hat{\Omega}_m$ may be based on one or more measurements. Alternatively or additionally, the estimated temperature $\hat{\Omega}_m$ may be calculated or otherwise determined using other data, e.g. as a function of power supplied to the electric motor 102 over time.

At 406, the method 400 determines a BEMF correction term based on the estimated PM flux linkage. For example, the controller 300 may include one or more hardware and/or software components implementing the rotor flux space vector compensator 154 configured to calculate the BEMF correction term $\Delta\hat{E}_{\alpha\beta}$ based on the estimated PM flux linkage $\hat{\lambda}_r^f$.

In some embodiments, step 406 may include determining a difference between the estimated PM flux linkage and a magnitude of the estimated rotor flux space vector. For example, the controller 300 may include one or more hardware and/or software components implementing the difference block 164 to calculate the flux linkage difference $\Delta\hat{\lambda}_r$ based on the open-loop or feedforward estimated permanent magnet (PM) flux linkage $\hat{\lambda}_r^f$ and the estimated rotor flux magnitude $|\hat{\lambda}_r|$. In some embodiments, step 406 may further include determining the BEMF correction term based on the difference between the estimated PM flux linkage and the magnitude of the estimated rotor flux space vector. For example, the controller 300 may include one or more hardware and/or software components implementing the flux compensation regulator 162 to calculate the BEMF correction term $\Delta\hat{E}_{\alpha\beta}$ based on the PM flux linkage difference $\Delta\hat{\lambda}_r$.

At 408, the method 400 determines an estimated rotor flux space vector based on the estimated BEMF and the BEMF correction term. For example, the controller 300 may include one or more hardware and/or software components implementing the rotor flux space vector estimator 150 to calculate the estimated rotor flux space vector $\hat{\lambda}_r$ based on the estimated BEMF $\hat{E}_{\alpha\beta}$ generated in windings of the electric motor 102 and the BEMF correction term $\Delta\hat{E}_{\alpha\beta}$.

At 410, the method 400 determines an estimated motor electrical position of the PMSM based on the estimated rotor flux space vector. Step 410 may include determining an angle of the estimated rotor flux space vector which represents the estimated motor electrical position. For example, the controller 300 may include one or more hardware and/or software components configured to convert the estimated rotor flux space vector $\hat{\lambda}_r$ to polar coordinates including an estimated rotor flux magnitude $|\hat{\lambda}_r|$ and an estimated rotor flux angle $\angle\hat{\lambda}_r$, which is equivalent to the estimated motor electrical position $\hat{\theta}_e^s$.

At 411, the method 400 determines a calculated motor electrical position of the PMSM based on a measured rotor position of the PMSM. For example, the controller 300 may include one or more hardware and/or software components implementing the motor position calculator 114 to compute the calculated motor electrical position $\hat{\theta}_e^m$ based on the measured rotor position information from the motor position sensor 108.

At 412, the method 400 verifies the measured rotor position of the PMSM by comparing the calculated motor electrical position to the estimated motor electrical position. For example, the controller 300 may include one or more hardware and/or software components implementing the motor position verifier 202 to verify a measurement of the rotor position $\theta_r$ by comparing the calculated motor electrical position $\hat{\theta}_e^m$ with the estimated motor electrical position $\hat{\theta}_e^s$ from the motor position estimator 118.

At 414, the method 400 controls the PMSM based on the estimated motor electrical position of the PMSM. For example, the controller 300 may include one or more hardware and/or software components implementing the third motor control system 220, with each of the inverter commutator 106 and the motor current estimator 116 configured to utilize the estimated motor electrical position $\hat{\theta}_e^s$ of the electric motor 102 from the motor position estimator 118.

At 416, the method 400 determines a feedforward estimated resistance based on an estimated temperature of the windings of the PMSM and an estimated temperature of a switching circuit within an inverter configured to supply power to the PMSM. For example, the controller 300 may include one or more hardware and/or software components implementing the feedforward resistance estimator 182 to determine the feedforward estimated resistance $\hat{R}^f$ based on the estimated winding temperature $\hat{\Omega}_w$ of the windings of the electric motor 102 and an estimated switch temperature $\hat{\Omega}_i$ of a switching circuit within the inverter 104 configured to supply power to the electric motor 102.

At 418, the method 400 determines the estimated motor circuit resistance based on the feedforward estimated resistance. For example, the controller 300 may include one or more hardware and/or software components implementing the resistance summing block 188 to determine the estimated motor circuit resistance $\hat{R}$ as a sum of the feedforward estimated resistance $\hat{R}^f$ and a resistance correction term $\hat{R}^b$.

At 420, the method 400 determines an estimated winding voltage of the PMSM based on: the feedforward estimated resistance, the estimated synchronous inductance of the PMSM, and the estimated PM flux linkage. For example, the controller 300 may include one or more hardware and/or software components implementing the voltage model 186 to determine the estimated winding voltage of the electric motor 102 as a feedforward voltage $V_{dq}^f$ based on: the feedforward estimated resistance $\hat{R}^f$, the estimated synchronous inductance $\hat{L}$, and the feedforward estimated PM flux linkage $\hat{\lambda}_r^f$ of the electric motor 102.

At 422, the method 400 determines a resistance correction term based on the estimated winding voltage of the windings of the PMSM and a motor voltage command for controlling an inverter supplying power to the PMSM. In some embodiments, Step 418 may include determining the estimated motor circuit resistance further based on the resistance correction term. For example, the controller 300 may include one or more hardware and/or software components implementing the resistance correction estimator 184 to determine the resistance correction term $\hat{R}^b$ based on the feedforward voltage $V_{dq}^f$, which may also be called an estimated winding voltage of the electric motor 102, and based on the motor voltage command $V^*_{dq}$ for controlling the inverter 104 supplying power to the electric motor 102.

At 424, the method 400 determines an inductance scale factor based on the estimated motor current. For example, the controller 300 may include one or more hardware and/or software components implementing the inductance scale factor calculator 191 to determine an inductance scale factor $\hat{\kappa}_l$ based on the estimated motor current $\hat{I}_{dq}$.

At 426, the method 400 determines a feedforward estimated inductance based on the inductance scale factor and a nominal inductance of the PMSM. For example, the controller 300 may include one or more hardware and/or software components implementing the feedforward inductance estimator 192 to determine the feedforward estimated inductance $\hat{L}^f$ based on the inductance scale factor $\kappa_l$ and based on the nominal inductance $\hat{L}^o$ of the electric motor 102.

At 428, the method 400 determines the estimated synchronous inductance based on the feedforward estimated inductance. For example, the controller 300 may include one or more hardware and/or software components implementing the inductance summing block 198 to determine the estimated synchronous inductance $\hat{L}$ of the electric motor 102 based on the feedforward estimated inductance $\hat{L}^f$. In some embodiments, determining the estimated synchronous inductance is further based on an inductance correction term. For example, the inductance summing block 198 to determine the estimated synchronous inductance $\hat{L}$ of the electric motor 102 as a sum of the feedforward estimated inductance $\hat{L}^f$ and the inductance correction term $\hat{L}^b$.

At 430, the method 400 determines a reconstructed motor current based on: the feedforward estimated inductance, an estimated motor circuit resistance, and an estimated PM flux linkage. For example, the controller 300 may include one or more hardware and/or software components implementing the current model 196 to determine the reconstructed current $I_{dq}^f$, which may also be called the reconstructed motor current, based on: the feedforward estimated inductance $\hat{L}^f$, the estimated motor circuit resistance $\hat{R}$, and the feedforward estimated PM flux linkage $\hat{\lambda}_r^f$ of the electric motor 102.

At 432, the method 400 determines an inductance correction term based on the reconstructed motor current and a commanded current supplied to a current regulator for controlling the PMSM. For example, the controller 300 may include one or more hardware and/or software components implementing the inductance correction estimator 194 to determine the inductance correction term $\hat{L}^b$ based on the reconstructed current $I_{dq}^f$, and a commanded current $I^*_{dq}$ supplied to the current regulator 112 for controlling the electric motor 102.

The present disclosure provides a method for controlling a permanent magnet synchronous machine (PMSM) having windings. The method includes: determining an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM; determining an estimated permanent magnet (PM) flux linkage in the PMSM based on the estimated motor current of the PMSM; determining a BEMF correction term based on the estimated PM flux linkage; and determining an estimated rotor flux space vector based on the estimated BEMF and the BEMF correction term.

In some embodiments, the method further includes: determining an estimated motor electrical position of the PMSM based on the estimated rotor flux space vector, including determining an angle of the estimated rotor flux space vector, and wherein the angle of the estimated rotor flux space vector represents the estimated motor electrical position.

In some embodiments, the method further includes: determining a calculated motor electrical position of the PMSM based on a measured rotor position of the PMSM; and verifying the measured rotor position of the PMSM by comparing the calculated motor electrical position to the estimated motor electrical position.

In some embodiments, the method further includes: controlling the PMSM based on the estimated motor electrical position of the PMSM.

In some embodiments, determining the BEMF correction term further comprises: determining a difference between the estimated PM flux linkage and a magnitude of the estimated rotor flux space vector; and determining the BEMF correction term based on the difference between the estimated PM flux linkage and the magnitude of the estimated rotor flux space vector.

In some embodiments, determining the estimated PM flux linkage further comprises: determining an estimated magnetic saturation scale factor based on the estimated motor current of the PMSM; and determining the estimated PM flux linkage based on the estimated magnetic saturation scale factor.

In some embodiments, determining the estimated PM flux linkage is further based on an estimated temperature of rotor magnets of the PMSM.

In some embodiments, the method further includes: determining a feedforward estimated resistance based on an estimated temperature of the windings of the PMSM and an estimated temperature of a switching circuit within an inverter configured to supply power to the PMSM; and determining the estimated motor circuit resistance based on the feedforward estimated resistance.

In some embodiments, the method further includes: determining an estimated winding voltage of the PMSM based on: the feedforward estimated resistance, the estimated synchronous inductance of the PMSM, and the estimated PM flux linkage; and determining a resistance correction term based on the estimated winding voltage of the windings of the PMSM and a motor voltage command for controlling an inverter supplying power to the PMSM, wherein determining the estimated motor circuit resistance is further based on the resistance correction term.

In some embodiments, the method further includes: determining an inductance scale factor based on the estimated motor current; determining a feedforward estimated inductance based on the inductance scale factor and a nominal inductance of the PMSM; and determining the estimated synchronous inductance based on the feedforward estimated inductance.

In some embodiments, the method further includes: determining a reconstructed motor current based on: the feedforward estimated inductance, an estimated motor circuit resistance, and an estimated PM flux linkage; and determining an inductance correction term based on the reconstructed motor current and a commanded current supplied to a current regulator for controlling the PMSM, wherein determining the estimated synchronous inductance is further based on the inductance correction term.

A system for controlling a permanent magnet synchronous machine (PMSM) is provided. The system includes: an inverter having a plurality of switches operable to supply an alternating current to the PMSM; and a controller. In some embodiments, the controller is configured to: determine an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM; determine an estimated permanent magnet (PM) flux linkage in the PMSM based on the estimated motor current of the PMSM; determine a BEMF correction term based on the estimated PM flux linkage; and determine an estimated rotor flux space vector based on the estimated BEMF and the BEMF correction term.

In some embodiments, the controller is further configured to determine an estimated motor electrical position of the PMSM based on the estimated rotor flux space vector, including determining an angle of the estimated rotor flux space vector, and wherein the angle of the estimated rotor flux space vector represents the estimated motor electrical position.

In some embodiments, the controller is further configured to use the estimated motor electrical position of the PMSM for least one of: verifying a measured rotor position of the PMSM by comparing the measured rotor position to the estimated motor electrical position, or transforming one or more signals between a time domain and a d-q reference frame based on the estimated motor electrical position of the PMSM.

In some embodiments, the controller is further configured to: determine a difference between the estimated PM flux linkage and a magnitude of the estimated rotor flux space vector; and determine the BEMF correction term based on the difference between the estimated PM flux linkage and the magnitude of the estimated rotor flux space vector.

In some embodiments, the controller is further configured to: determine an estimated magnetic saturation scale factor based on the estimated motor current of the PMSM; and determine the estimated PM flux linkage based on the estimated magnetic saturation scale factor and an estimated temperature of rotor magnets of the PMSM.

In some embodiments, the controller is further configured to: determine a feedforward estimated resistance based on an estimated temperature of the windings of the PMSM and an estimated temperature of a switching circuit within an inverter configured to supply power to the PMSM; and determine the estimated motor circuit resistance based on the feedforward estimated resistance.

In some embodiments, the controller is further configured to: determine an estimated winding voltage of the PMSM based on: the feedforward estimated resistance, the estimated synchronous inductance of the PMSM, and the estimated PM flux linkage; and determine a resistance correction term based on the estimated winding voltage of the windings of the PMSM and a motor voltage command for controlling an inverter supplying power to the PMSM, wherein determining the estimated motor circuit resistance is further based on the resistance correction term.

In some embodiments, the controller is further configured to: determine an inductance scale factor based on the estimated motor current; determine a feedforward estimated inductance based on the inductance scale factor and a nominal inductance of the PMSM; and determine the estimated synchronous inductance based on the feedforward estimated inductance.

In some embodiments, the controller is further configured to: determine a reconstructed motor current based on: the feedforward estimated inductance, an estimated motor circuit resistance, and an estimated PM flux linkage; determine an inductance correction term based on the reconstructed motor current and a commanded current supplied to a current regulator for controlling the PMSM, wherein determining the estimated synchronous inductance is further based on the inductance correction term.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for controlling a permanent magnet synchronous machine (PMSM) having windings, comprising:
   determining an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM;
   determining an estimated permanent magnet (PM) flux linkage in the PMSM based on the estimated motor current of the PMSM;
   determining a BEMF correction term based on the estimated PM flux linkage; and
   determining an estimated rotor flux space vector based on the estimated BEMF and the BEMF correction term.

2. The method of claim 1, further comprising determining an estimated motor electrical position of the PMSM based on the estimated rotor flux space vector, including determining an angle of the estimated rotor flux space vector, wherein the angle of the estimated rotor flux space vector represents the estimated motor electrical position.

3. The method of claim 2, further comprising:
   determining a calculated motor electrical position of the PMSM based on a measured rotor position of the PMSM; and
   verifying the measured rotor position of the PMSM by comparing the calculated motor electrical position to the estimated motor electrical position.

4. The method of claim 2, further comprising controlling the PMSM based on the estimated motor electrical position of the PMSM.

5. The method of claim 1, wherein determining the BEMF correction term further comprises:
   determining a difference between the estimated PM flux linkage and a magnitude of the estimated rotor flux space vector; and
   determining the BEMF correction term based on the difference between the estimated PM flux linkage and the magnitude of the estimated rotor flux space vector.

6. The method of claim 1, wherein determining the estimated PM flux linkage further comprises:
   determining an estimated magnetic saturation scale factor based on the estimated motor current of the PMSM; and
   determining the estimated PM flux linkage based on the estimated magnetic saturation scale factor.

7. The method of claim 6, wherein determining the estimated PM flux linkage is further based on an estimated temperature of rotor magnets of the PMSM.

8. The method of claim 1, wherein the method further comprises:
   determining a feedforward estimated resistance based on an estimated temperature of the windings of the PMSM and an estimated temperature of a switching circuit within an inverter configured to supply power to the PMSM; and
   determining the estimated motor circuit resistance based on the feedforward estimated resistance.

9. The method of claim 8, wherein the method further comprises:
   determining an estimated winding voltage of the PMSM based on: the estimated motor current, the feedforward estimated resistance, the estimated synchronous inductance of the PMSM, and the estimated PM flux linkage; and determining a resistance correction term based on the estimated winding voltage of the windings of the PMSM and a motor voltage command for controlling an inverter supplying power to the PMSM, wherein determining the estimated motor circuit resistance is further based on the resistance correction term.

10. The method of claim 1, wherein the method further comprises:

determining an inductance scale factor based on the estimated motor current;

determining a feedforward estimated inductance based on the inductance scale factor and a nominal inductance of the PMSM; and determining the estimated synchronous inductance based on the feedforward estimated inductance.

11. The method of claim 10, wherein the method further comprises:

determining a reconstructed motor current based on: the feedforward estimated inductance, an estimated motor circuit resistance, and an estimated PM flux linkage; and determining an inductance correction term based on the reconstructed motor current and a commanded current supplied to a current regulator for controlling the PMSM, wherein determining the estimated synchronous inductance is further based on the inductance correction term.

12. A system for controlling a permanent magnet synchronous machine (PMSM), comprising:

an inverter having a plurality of switches operable to supply an alternating current to the PMSM; and a controller configured to:

determine an estimated back-electromotive force (BEMF) generated in windings of the PMSM based on an estimated voltage applied to the windings of the PMSM, an estimated motor current of the PMSM, an estimated motor circuit resistance, and an estimated synchronous inductance of the PMSM;

determine an estimated permanent magnet (PM) flux linkage in the PMSM based on the estimated motor current of the PMSM;

determine a BEMF correction term based on the estimated PM flux linkage; and determine an estimated rotor flux space vector based on the estimated BEMF and the BEMF correction term.

13. The system of claim 12, wherein the controller is further configured to determine an estimated motor electrical position of the PMSM based on the estimated rotor flux space vector, including determining an angle of the estimated rotor flux space vector, wherein the angle of the estimated rotor flux space vector represents the estimated motor electrical position.

14. The system of claim 13, wherein the controller is further configured to use the estimated motor electrical position of the PMSM for least one of:

verifying a measured rotor position of the PMSM by comparing the measured rotor position to the estimated motor electrical position, or transforming one or more signals between a time domain and a d-q reference frame based on the estimated motor electrical position of the PMSM.

15. The system of claim 12, wherein the controller is further configured to:

determine a difference between the estimated PM flux linkage and a magnitude of the estimated rotor flux space vector; and determine the BEMF correction term based on the difference between the estimated PM flux linkage and the magnitude of the estimated rotor flux space vector.

16. The system of claim 12, wherein the controller is further configured to:

determine an estimated magnetic saturation scale factor based on the estimated motor current of the PMSM; and determine the estimated PM flux linkage based on the estimated magnetic saturation scale factor and an estimated temperature of rotor magnets of the PMSM.

17. The system of claim 12, wherein the controller is further configured to:

determine a feedforward estimated resistance based on an estimated temperature of the windings of the PMSM and an estimated temperature of a switching circuit within an inverter configured to supply power to the PMSM; and determine the estimated motor circuit resistance based on the feedforward estimated resistance.

18. The system of claim 17, wherein the controller is further configured to:

determine an estimated winding voltage of the PMSM based on: the estimated motor current, the feedforward estimated resistance, the estimated synchronous inductance of the PMSM, and the estimated PM flux linkage; and determine a resistance correction term based on the estimated winding voltage of the windings of the PMSM and a motor voltage command for controlling an inverter supplying power to the PMSM, wherein determining the estimated motor circuit resistance is further based on the resistance correction term.

19. The system of claim 12, wherein the controller is further configured to:

determine an inductance scale factor based on the estimated motor current;

determine a feedforward estimated inductance based on the inductance scale factor and a nominal inductance of the PMSM; and determine the estimated synchronous inductance based on the feedforward estimated inductance.

20. The system of claim 19, wherein the controller is further configured to:

determine a reconstructed motor current based on: the feedforward estimated inductance, an estimated motor circuit resistance, and an estimated PM flux linkage; and determine an inductance correction term based on the reconstructed motor current and a commanded current supplied to a current regulator for controlling the PMSM, wherein determining the estimated synchronous inductance is further based on the inductance correction term.

* * * * *